(12) United States Patent
Jones et al.

(10) Patent No.: US 11,493,143 B2
(45) Date of Patent: Nov. 8, 2022

(54) HEATING OF SOLENOIDS

(71) Applicant: Goodrich Actuation Systems Limited, Solihull (GB)

(72) Inventors: Tony Jones, Birmingham (GB); Peter William Bacon, Wolverhampton (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 195 days.

(21) Appl. No.: 16/690,768

(22) Filed: Nov. 21, 2019

(65) Prior Publication Data

US 2020/0263802 A1 Aug. 20, 2020

Related U.S. Application Data

(63) Continuation of application No. 15/399,814, filed on Jan. 6, 2017, now Pat. No. 10,663,078.

(30) Foreign Application Priority Data

Jan. 8, 2016 (EP) ..................................... 16150570

(51) Int. Cl.
*F16K 49/00* (2006.01)
*F16K 31/06* (2006.01)
*B64C 25/44* (2006.01)
*B60T 8/00* (2006.01)
*H01F 7/06* (2006.01)
*B60T 8/36* (2006.01)

(52) U.S. Cl.
CPC ............ *F16K 31/0679* (2013.01); *B60T 8/00* (2013.01); *B64C 25/44* (2013.01); *F16K 49/002* (2013.01); *H01F 7/064* (2013.01); *B60T 8/36* (2013.01); *B60T 8/3645* (2013.01)

(58) Field of Classification Search
CPC ....... F16K 31/0679; F16K 49/002; B60T 8/00
See application file for complete search history.

(56) References Cited

U.S. PATENT DOCUMENTS

| 3,201,670 A | 8/1965 | Myers |
| 4,306,704 A | 12/1981 | Clark |
| 4,609,965 A | 9/1986 | Baker |
| 4,688,138 A | 8/1987 | Nagata et al. |
| 5,354,965 A | 10/1994 | Lee |

(Continued)

FOREIGN PATENT DOCUMENTS

WO 2015104920 A1 7/2015

OTHER PUBLICATIONS

European Search Report for Application No. 16150570.6-1556, dated Aug. 10, 2016, 7 Pages.

*Primary Examiner* — Scott Bauer
(74) *Attorney, Agent, or Firm* — Cantor Colburn LLP

(57) ABSTRACT

A solenoid comprises first and second coils connected to an electrical power supply circuit. In a first mode of operation the power supply circuit is arranged to provide a current flowing in opposite directions through the respective first and second coils, e.g. to produce a self-heating effect. In a second mode of operation the power supply circuit is arranged to provide a current flowing in the same direction through the respective first and second coils, e.g. to generate a magnetic force. In some embodiments, the power supply circuit includes a bridge rectifier or full wave rectifier connected to a bi-directional current driver.

12 Claims, 2 Drawing Sheets

(56) References Cited

U.S. PATENT DOCUMENTS

| | | | |
|---|---|---|---|
| 5,363,270 A | 11/1994 | Wahba | |
| 5,384,448 A | 1/1995 | Kubasko | |
| 5,892,650 A | 4/1999 | Kinoshita et al. | |
| 5,971,503 A * | 10/1999 | Joyce | B60T 8/3675 |
| | | | 303/191 |
| 6,046,900 A | 4/2000 | Massey et al. | |
| 6,199,587 B1 | 3/2001 | Shlomi et al. | |
| 6,392,865 B1 | 5/2002 | Fochtman et al. | |
| 6,684,920 B2 * | 2/2004 | Seitz | B67D 1/0085 |
| | | | 141/198 |
| 7,549,438 B2 * | 6/2009 | Koenekamp | F16K 49/002 |
| | | | 137/341 |
| 2007/0145316 A1 | 6/2007 | Morikawa | |
| 2007/0146956 A1 | 6/2007 | Panzer et al. | |
| 2009/0026985 A1 * | 1/2009 | Beyse | B60T 8/363 |
| | | | 318/135 |
| 2010/0090144 A1 * | 4/2010 | Brandt, Jr. | F16K 37/0041 |
| | | | 251/129.21 |
| 2015/0267662 A1 | 9/2015 | Nehl et al. | |
| 2017/0198828 A1 | 7/2017 | Jones et al. | |

* cited by examiner

HEATING OF SOLENOIDS

CROSS REFERENCE TO RELATED APPLICATIONS

The present application is a continuation application of U.S. patent application Ser. No. 15/399,814, filed on Jan. 6, 2017, which claims priority to European Patent Application No. 16150570.6 filed Jan. 8, 2016, the entire contents of each which is incorporated herein by reference.

TECHNICAL FIELD

The present disclosure relates to heating of solenoids for improved performance.

BACKGROUND

Solenoid-operated devices are used in many different situations to convert electrical energy into linear motion. For example, a solenoid switch is a type of relay that uses an internal electromechanical solenoid to operate a switch in an electrical circuit. Solenoid valves are integrated devices containing an electromechanical solenoid which actuates either a pneumatic or hydraulic valve. Solenoid valves are used in fluid power systems, to control pneumatic or hydraulic cylinders, and in aircraft e.g. for fuel systems (fuel control, firewall shutoff, etc.) and environmental control systems (engine bleed air control, canopy seal inflation, coolant flow, etc.).

One application of hydraulic solenoid valves is to apply the brakes to the wheels of an aircraft. Another application of hydraulic solenoid valves is to apply the wing tip brakes which maintain symmetrical extension of the left and right flaps for each wing. The wing tip brakes lock the flaps and prevent further movement when a failure occurs in the aircraft actuation system. Typically the wing flaps of an aircraft are driven by a single motor with two shafts. If one shaft jams or breaks, then the wing tip brake operates to stop any movement of the other shaft and avoid the problem of unsynchronous flap extension. Once applied, the wing tip brake cannot be released in flight.

A particular issue facing wing tip brakes is that the hydraulic solenoid valve is rarely operated, only in a failure situation, but it must be primed to act quickly in case it is needed. Wing tip brakes are exposed to very harsh environmental conditions, with temperatures during flight down to −55° C. The operating times of hydraulic solenoid valves are adversely affected at low temperature due to increased fluid viscosity. Even beyond hydraulic systems, solenoid-operated devices may in general suffer a reduction in performance where drags and efficiencies are impacted by low temperature.

One way to ensure good performance in aircraft hydraulic systems is to heat the hydraulic fluid in response to low ambient temperatures. Separate electrical heating systems have been tried, but are not practical insofar as space, weight and efficiency are concerned. There remains a need for an efficient self-heating method in hydraulic solenoid valves and other solenoid-operated devices.

SUMMARY

According to a first aspect of the present disclosure there is provided a solenoid comprising first and second coils connected to an electrical power supply circuit, wherein in a first mode of operation the power supply circuit is arranged to provide a current flowing in opposite directions through the respective first and second coils and in a second mode of operation the power supply circuit is arranged to provide a current flowing in the same direction through the respective first and second coils.

In the first mode of operation of such a solenoid, the current passing through the first and second coils is in opposite directions so their flux paths oppose each other and hence no net magnetic force is generated. Thus, regardless of the current level, in the first mode of operation the solenoid will not operate. Rather, the first mode of operation provides a self-heating effect. It is only in the second mode of operation that a current flows through the first and second coils in the same direction so their flux paths are aligned and the solenoid operates to generate a net magnetic force. This means that the same coils that are used for energising the solenoid are also used for heating and hence no additional heating circuit or component is required. The self-heating effect can be tailored to a particular application, as the solenoid can be supplied with a current in the first mode of operation that is different to the pull-in current in the second mode of operation.

In some examples, the current flowing through the first and second coils in the first mode operation may be less than the current flowing through the first and second coils in the second mode operation. Accordingly the self-heating can be kept to a low level and power consumption minimised. In some examples, the current flowing through the first and second coils in the first mode operation may be substantially equal to the current flowing through the first and second coils in the second mode operation. Accordingly the power supply circuit may not need to adjust the current level when switching between the first and second modes. In other examples, the current flowing through the first and second coils in the first mode operation may be greater than the current flowing through the first and second coils in the second mode operation. Accordingly the self-heating can be maximised without the solenoid operating in the first mode of operation. This can be contrasted with self-heating produced by a low level (e.g. ~mA) 'trickle' current in a solenoid comprising a single coil, where the current level must be kept well below the pull-in current to protect against inadvertent operation. Failure to regulate such a 'trickle' current to safe levels could result in inadvertent operation of the solenoid.

Solenoids according to the present disclosure may be found particularly beneficial in applications where the solenoid is located in a cold environment and can be held in the first mode of operation until such time as required to operate, thereby improving its response time when switched to the second mode of operation. In a preferred set of examples, the first mode of operation is a default mode of operation. This means that the solenoid is always self-heated when not in the second "active" mode of operation. Preferably no other modes of operation are applied to the solenoid. However, it may still be possible to remove the power supply from the coils so that the solenoid can be electrically isolated e.g. for maintenance purposes.

In at least some examples, the first and second coils are permanently connected to the power supply circuit. The power supply circuit may form part of the solenoid, or the solenoid may comprise electrical connections for an external power supply circuit. In some examples the power supply circuit may include a switch arranged to open the circuit and therefore remove electrical power from the coils. In some examples the power supply circuit may include an electrical power source that can be switched on and off.

An advantage of providing a solenoid with the two different modes of operation, as disclosed herein, is that the two coils can share an electrical connection to the power supply circuit. Whether the solenoid is operating in "self-heating" mode or "active" mode depends only on the direction of current flowing through the first and second coils. A single power source may provide for a reversal in the direction of current provided by the power supply circuit. Thus in preferred examples the first and second coils are both connected to the electrical power supply circuit by a shared pair of electrical connections. The shared pair of electrical connections may comprise, for instance, a pair of electrical wires. This means that a solenoid comprising two coils (e.g. in series) can be operated in an additional mode using only the two existing wires.

In one set of examples, the electrical power supply circuit comprises one or more current drivers. The one or more current drivers may be used to directly control the electrical current that passes through the first and second coils. Preferably the power supply circuit provides a current that is always non-zero in the first and second modes of operation. As is explained above, this means that the solenoid is always self-heated when it is not operating to apply a magnetic force.

In a first set of examples, the electrical power supply circuit comprises a single current driver connected to both of the first and second coils. The single current driver may be connected to both of the first and second coils by a shared pair of electrical connections (e.g. two wires) as mentioned above. Preferably the current driver is a bi-directional current driver. The power supply circuit may include a bridge rectifier or full wave rectifier connected to the current driver. The bridge rectifier or full wave rectifier can be connected in parallel with either the first coil or the second coil. This means that, depending on the direction of current provided by the bi-directional current driver, the current will either flow in opposite directions through the first and second coils (i.e. in the first mode of operation) or in the same direction through the first and second coils (i.e. in the second mode of operation). An advantage of such an arrangement is that only two electrical connections (e.g. two wires) are required between the coils of the solenoid and the power supply circuit. The power supply circuit may comprise a controller arranged to control the direction of current provided by the bi-directional current driver. This controller may then be used to switch the solenoid between the first and second modes of operation upon demand. In addition, the controller may optionally be arranged to control the magnitude of current provided by the bi-directional current driver. Controlling the magnitude of the current allows different levels of heating (i.e. in the first mode of operation) and also different pull-in and hold-in currents (i.e. in the second mode of operation). The solenoid may be isolated from the electrical power supply by switching off or disconnecting the current driver.

In a second set of examples, the electrical power supply circuit comprises a first current driver connected to the first coil and a second current driver connected to the second coil. Preferably at least one of the first and second current drivers is a bi-directional current driver. In some examples, one of the first and second current drivers is a bi-directional current driver and the other of the first and second current drivers is a uni-directional current driver. Depending on the direction of current provided by the bi-directional current driver(s), the current will either flow in opposite directions through the first and second coils (i.e. in the first mode of operation) or in the same direction through the first and second coils (i.e. in the second mode of operation). Such an arrangement requires at least four electrical connections (e.g. four wires) between the coils of the solenoid and the current drivers in the power supply circuit. However a bridge rectifier or full wave rectifier may not be required in the power supply circuit.

In the second set of examples the first and second current drivers, and hence the first and second coils, may be controlled individually. The power supply circuit may comprise a controller arranged to control the current supplied by the first and/or second current driver. The power supply circuit may comprise a controller arranged to control the direction of current provided by the bi-directional current driver(s). This controller may then be used to switch the solenoid between the first and second modes of operation upon demand. In addition, the controller may optionally be arranged to control the magnitude of current provided by the bi-directional current driver(s). The same controller, or a further controller, may also be arranged to control the magnitude of current provided by the uni-directional current driver, where one is provided. Controlling the magnitude of the current allows different levels of heating (i.e. in the first mode of operation) and also different pull-in and hold-in currents (i.e. in the second mode of operation). The solenoid may be isolated from the electrical power supply by switching off or disconnecting the first and second current drivers.

In a third set of examples the electrical power supply circuit comprises a voltage source connected to both of the first and second coils to supply a current in a given direction. The voltage source may be connected to both of the first and second coils by a shared pair of electrical connections (e.g. two wires) as mentioned above. The voltage source may be connected to a controller that is arranged to switch the polarities of the voltage source and hence the direction of the current supplied by the voltage source. Alternatively, the power supply circuit may further comprise one or more switches arranged to switch the direction of the current supplied to one or both of the first or second coils. This means that, depending on the direction of current provided by the power supply circuit, the current will either flow in opposite directions through the first and second coils (i.e. in the first mode of operation) or in the same direction through the first and second coils (i.e. in the second mode of operation). In some examples, the power supply circuit comprises a bridge rectifier or full wave rectifier. The bridge rectifier or full wave rectifier can be connected in parallel with either the first coil or the second coil. In such examples the power supply circuit may be connected to both the first and second coils by a single pair of connections (i.e. two wires). In other examples, the power supply circuit may be connected to each of the first and second coils by a respective pair of connections (i.e. four wires in total). In such examples a bridge rectifier or full wave rectifier may not be required in the power supply circuit.

In the third set of examples the power supply circuit may comprise a controller that is arranged to control the one or more switches. The same controller, or a further controller, may optionally be arranged to control the magnitude of current supplied by the voltage source. Controlling the magnitude of the current allows different levels of heating (i.e. in the first mode of operation) and also different pull-in and hold-in currents (i.e. in the second mode of operation). It will be appreciated that in the third set of examples it is not possible to completely remove current from the solenoid as long as the power supply circuit is connected to the voltage source. In at least some examples the power supply circuit may comprise one or more further switches arranged between the voltage source and the coils. This further switch may be controlled by the same controller or a further controller. This can allow the solenoid to be isolated from the electrical power supply as necessary.

In various examples of the present disclosure, both the first and second coils are integrated into the solenoid. The first and second coils may each be wound on separate axes, or they may be co-wound on the same axis. The first and/or second coil may include a magnetic, e.g. ferromagnetic core. For example, the first and/or second coil may include an iron core, as is standard in electromagnets. The first and second coils may share a common core. In various examples of the present disclosure, each of the first and second coils may comprise multiple sub-coils or multiple windings forming the coil. The first and second coils may have the same number of turns or a different number of turns.

It will be recognised that solenoids as disclosed and described herein may find use in a variety of solenoid-operated devices, such as solenoid switches and solenoid valves. In preferred examples, the present disclosure defines a hydraulic solenoid valve comprising a solenoid as disclosed hereinabove. Such hydraulic solenoid valves may take advantage of the self-heating effect provided by the first mode of operation to combat low operating temperatures and provide an improved response. This may be found particularly beneficial in aircraft environments. The present disclosure therefore includes a wig tip brake comprising such a hydraulic solenoid valve.

According to a second aspect of the present disclosure there is provided a method of controlling a solenoid comprising first and second coils connected to an electrical power supply circuit, the method comprising: a first mode of operation wherein the power supply circuit is controlled to provide a current flowing in opposite directions through the respective first and second coils; and a second mode of operation wherein the power supply circuit is controlled to provide a current flowing in the same direction through the respective first and second coils.

BRIEF DESCRIPTION OF DRAWINGS

One or more non-limiting examples will now be described, with reference to the accompanying drawings, in which.

DETAILED DESCRIPTION

Figure 1:
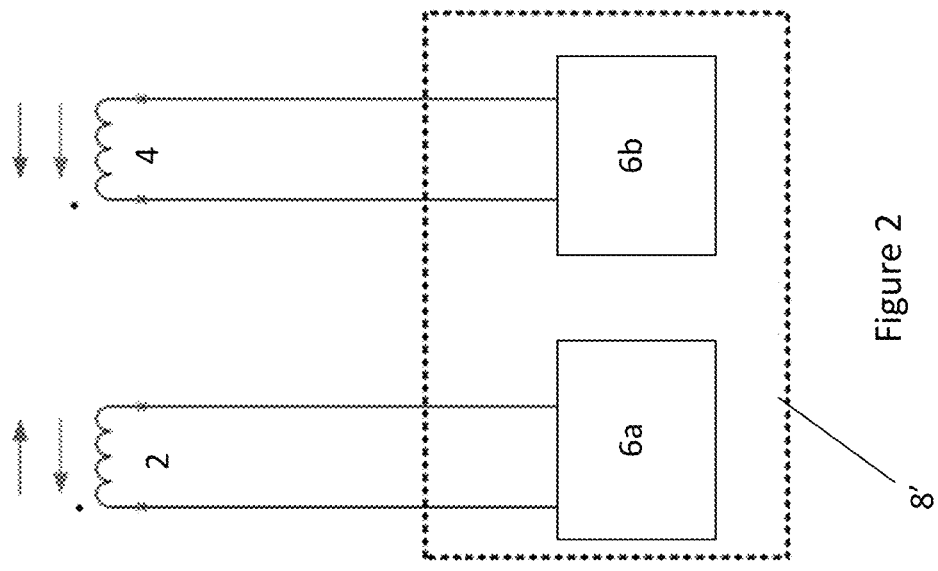
FIG. 1 shows a schematic layout for a solenoid and power supply circuit according to a first example.

In the first example seen in FIG. 1, a solenoid comprises a first coil 2 and a second coil 4. Both of the coils 2, 4 are connected to a common current driver 6 in a power supply circuit 8 by a single pair of wires. The power supply circuit 8 may include a controller (not shown). The current driver 6 is a bi-directional current driver that can be controlled to supply current in the circuit 8 in either direction. A full wave rectifier 10 is connected in parallel with the second coil 4. Although not illustrated, it will be appreciated that the full wave rectifier 10 could alternatively be connected in parallel with the first coil 2 instead.

The solenoid has two modes of operation. In a first mode of operation, represented by the upper set of arrows, the current driver 6 provides a current flowing in a generally clockwise direction in the power supply circuit 8. The full wave rectifier 10 causes the current to pass through the second coil 4 in the opposite direction to the current passing through the first coil 2. This means that the magnetic flux paths created by the two coils 2, 4 are in opposite directions and oppose each other so no magnetic force is generated. Only a self-heating effect is produced in the first mode of operation. In a second mode of operation, represented by the lower set of arrows, the current driver 6 is reversed so that current flows in a generally anti-clockwise direction in the power supply circuit 8. The full wave rectifier 10 causes the current to pass through the second coil 4 in the same direction as the current passing through the first coil 2. This means that the magnetic flux paths created by the two coils 2, 4 are aligned and the solenoid operates to generate a magnetic force.

Figure 2:
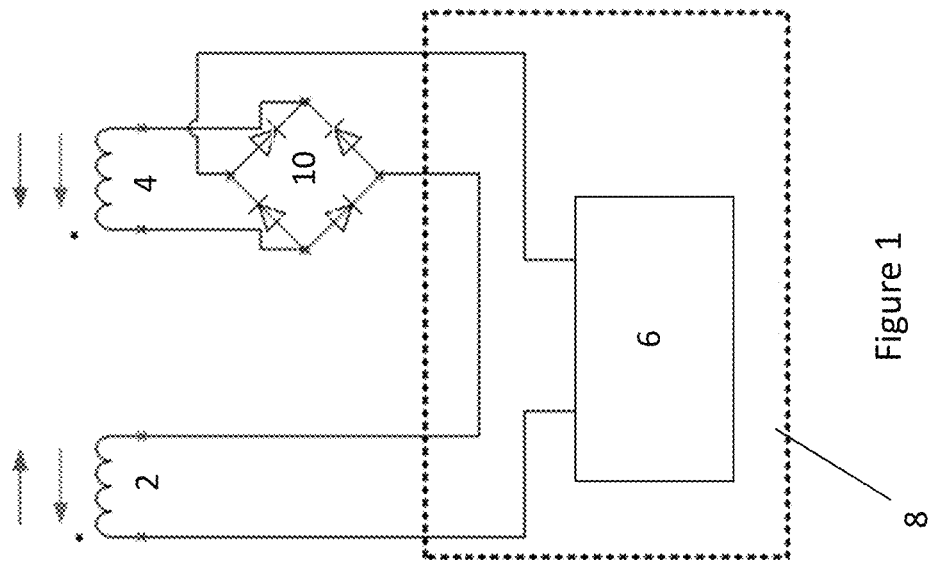
FIG. 2 shows a schematic layout for a solenoid and power supply circuit according to a second example.

In the second example seen in FIG. 2, a solenoid comprises a first coil 2 and a second coil 4 connected to a power supply circuit 8'. The first coil 2 is connected to a first current driver 6a and the second coil 4 is connected to a second current driver 6b. The power supply circuit 8' may include a controller (not shown). The first current driver 6a is a bi-directional current driver that can be controlled to supply current to the first coil 2 in either direction. The second current driver 6b is a uni-directional current driver that supplies current to the second coil 4 in an anti-clockwise direction. There is no full wave rectifier in this power supply circuit 8'.

The solenoid has two modes of operation. In a first mode of operation, represented by the upper set of arrows, the bi-directional current driver 6a provides a current flowing in a clockwise direction to the first coil 2, which is in the opposite direction to the current passing through the second coil 4. This means that the magnetic flux paths created by the two coils 2, 4 are in opposite directions and oppose each other so no magnetic force is generated. Only a self-heating effect is produced in the first mode of operation. In a second mode of operation, represented by the lower set of arrows, the bi-directional current driver 6a is reversed so that current flows in an anti-clockwise direction through the first coil 2 i.e. in the same direction as the current passing through the second coil 4. This means that the magnetic flux paths created by the two coils 2, 4 are aligned and the solenoid operates to generate a magnetic force.

Figure 3:
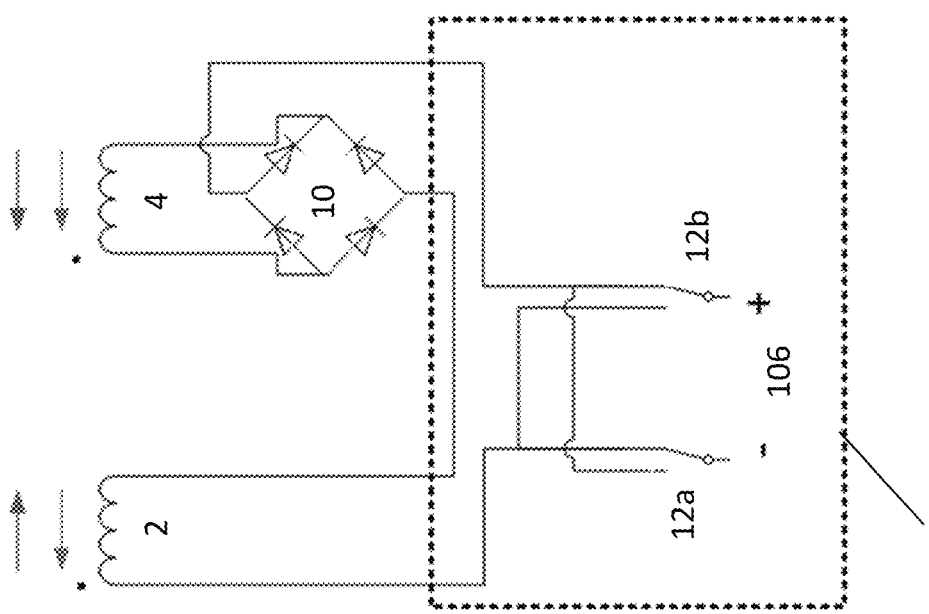
FIG. 3 shows a schematic layout for a solenoid and power supply circuit according to a third example.

In the third example seen in FIG. 3, a solenoid comprises a first coil 2 and a second coil 4. Both of the coils 2, 4 are connected by a single pair of wires to a common voltage source 106 by a power supply circuit 108. The power supply circuit 108 may include a controller (not shown). The power supply circuit 108 includes a single pair of electrical connections for the two coils 2, 4, each electrical connection including a switch 12a, 12b. The two switches 12a, 12b can both be in a closed position as seen in FIG. 3, or both opened, so as to supply current to the coils 2, 4 in either direction. A full wave rectifier 10 is connected in parallel with the second coil 4. Of course it will be appreciated that the electrical connections could be reversed and the full wave rectifier 10 connected in parallel with the first coil 2 instead.

The solenoid has two modes of operation. In a first mode of operation, represented by the upper set of arrows, the switches 12a, 12b are moved across from the closed position seen in FIG. 3 so as to provide a current flowing in a generally clockwise direction in the power supply circuit 108. The full wave rectifier 10 causes the current to pass through the second coil 4 in the opposite direction to the current passing through the first coil 2. This means that the magnetic flux paths created by the two coils 2, 4 are in opposite directions and oppose each other so no magnetic force is generated. Only a self-heating effect is produced in the first mode of operation. In a second mode of operation, represented by the lower set of arrows, the switches 12a, 12b are held in the position seen in FIG. 3 so as to provide a current flowing in a generally anti-clockwise direction in the power supply circuit 108. The full wave rectifier 10 causes the current to pass through the second coil 4 in the same direction as the current passing through the first coil 2. This means that the magnetic flux paths created by the two coils 2, 4 are aligned and the solenoid operates to generate a magnetic force.

Figure 4:
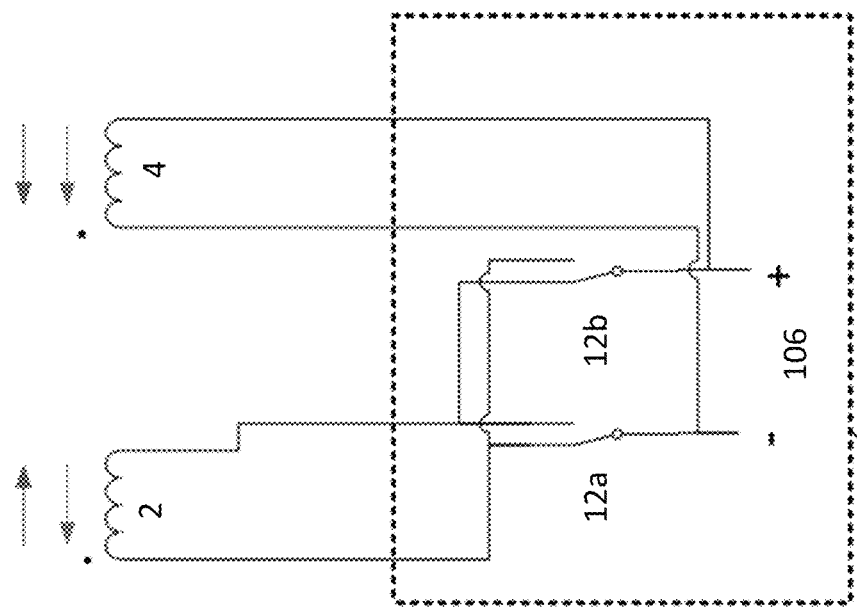
FIG. 4 shows a schematic layout for a solenoid and power supply circuit according to a fourth example.

In the fourth example seen in FIG. 4, a solenoid comprises a first coil 2 and a second coil 4. Both of the coils 2, 4 are connected by a single pair of wires to a common voltage source 106 by a power supply circuit 208. The power supply circuit 208 includes a pair of electrical connections for each of the first and second coils 2, 4, i.e. four wires in total. The electrical connection for each of the coils 2, 4 includes a switch 12a, 12b. The two switches 12a, 12b can both be in a closed position as seen in FIG. 4, or both opened, so as to supply current to the coils 2, 4 in either direction.

The solenoid has two modes of operation. In a first mode of operation, represented by the upper set of arrows, the switches 12a, 12b are moved across from the closed position seen in FIG. 4 so as to provide a current flowing in a clockwise direction through the first coil 2, which is in the opposite direction to the current flowing anti-clockwise through the second coil 4. This means that the magnetic flux paths created by the two coils 2, 4 are in opposite directions and oppose each other so no magnetic force is generated. Only a self-heating effect is produced in the first mode of operation. In a second mode of operation, represented by the lower set of arrows, the switches 12a, 12b are in the closed position seen in FIG. 4 so as to provide a current flowing in an anti-clockwise direction through the first coil 2, which is in the same direction as the current flowing through the second coil 4. This means that the magnetic flux paths created by the two coils 2, 4 are aligned and the solenoid operates to generate a magnetic force. The power supply circuit 208 may include a controller (not shown) that acts to open and close the switches 12a, 12b.

The invention claimed is:

1. A solenoid comprising:
   a first coil connected to an electrical power supply circuit; and
   a second coil connected to the electrical power supply circuit;
   wherein the electrical power supply circuit comprises a first current driver connected to the first coil and a second current driver connected to the second coil;
   wherein in a first mode of operation the electrical power supply circuit is arranged to provide a current flowing in opposite directions through the respective first and second coils, and in a second mode of operation the power supply circuit is arranged to provide a current flowing in the same direction through the respective first and second coils;
   wherein the current flowing through the first and second coils in the first mode operation is greater than the current flowing through the first and second coils in the second mode operation.

2. The solenoid of claim 1, wherein at least one of the first and second current drivers is a bi-directional current driver.

3. The solenoid of claim 1, wherein the power supply circuit comprises a controller arranged to control the direction of current provided by the bi-directional current driver.

4. The solenoid of claim 1, wherein a controller is arranged to control the magnitude of current provided by the first or second current drivers.

5. The solenoid of claim 1, wherein the first mode of operation is a default mode of operation.

6. A hydraulic solenoid valve comprising:
   the solenoid of claim 1.

7. A method of controlling a solenoid comprising first and second coils connected to an electrical power supply circuit comprising a first current driver connected to the first coil and a second current driver connected to the second coil, the method comprising:
   a first mode of operation wherein the power supply circuit is controlled to provide a current flowing in opposite directions through the respective first and second coils; and
   a second mode of operation wherein the power supply circuit is controlled to provide a current flowing in the same direction through the respective first and second coils;
   wherein the current flowing through the first and second coils in the first mode operation is greater than the current flowing through the first and second coils in the second mode operation.

8. A solenoid comprising:
   a first coil connected to an electrical power supply circuit;
   a second coil connected to the electrical power supply circuit; and
   a bridge rectifier or a full wave rectifier connected to the voltage source in parallel with only one of the first coil and the second coil;
   wherein in a first mode of operation the power supply circuit is arranged to provide a current flowing in opposite directions through the respective first and second coils and in a second mode of operation the power supply circuit is arranged to provide a current flowing in the same direction through the respective first and second coils;
   wherein the electrical power supply circuit includes only two electrical connections that connect the voltage source to both of the first and second coils.

9. The solenoid of claim 8, further comprising one or more switches arranged to switch the direction of the current supplied to one or both of the first or second coils.

10. The solenoid of claim 8, wherein the current flowing through the first and second coils in the first mode operation is greater than the current flowing through the first and second coils in the second mode operation.

11. The solenoid of claim 8, wherein the first mode of operation is a default mode of operation.

12. A hydraulic solenoid valve comprising the solenoid of claim 8.

* * * * *